J. G. P. THOMAS.
POWER TRANSMISSION MECHANISM.
APPLICATION FILED OCT. 24, 1910.

1,144,011.

Patented June 22, 1915.
2 SHEETS—SHEET 1.

Witnesses

Inventor
John Godfrey Parry Thomas
per:
Attorney.

J. G. P. THOMAS.
POWER TRANSMISSION MECHANISM.
APPLICATION FILED OCT. 24, 1910.
1,144,011.
Patented June 22, 1915.
2 SHEETS—SHEET 2.
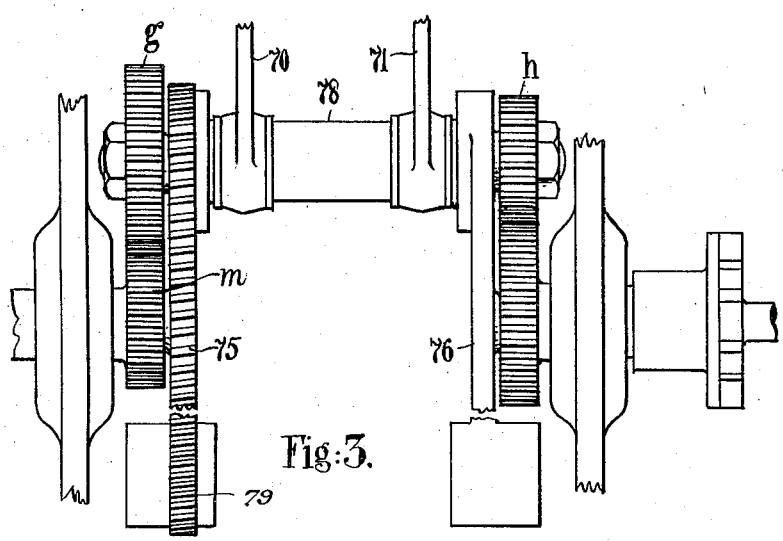
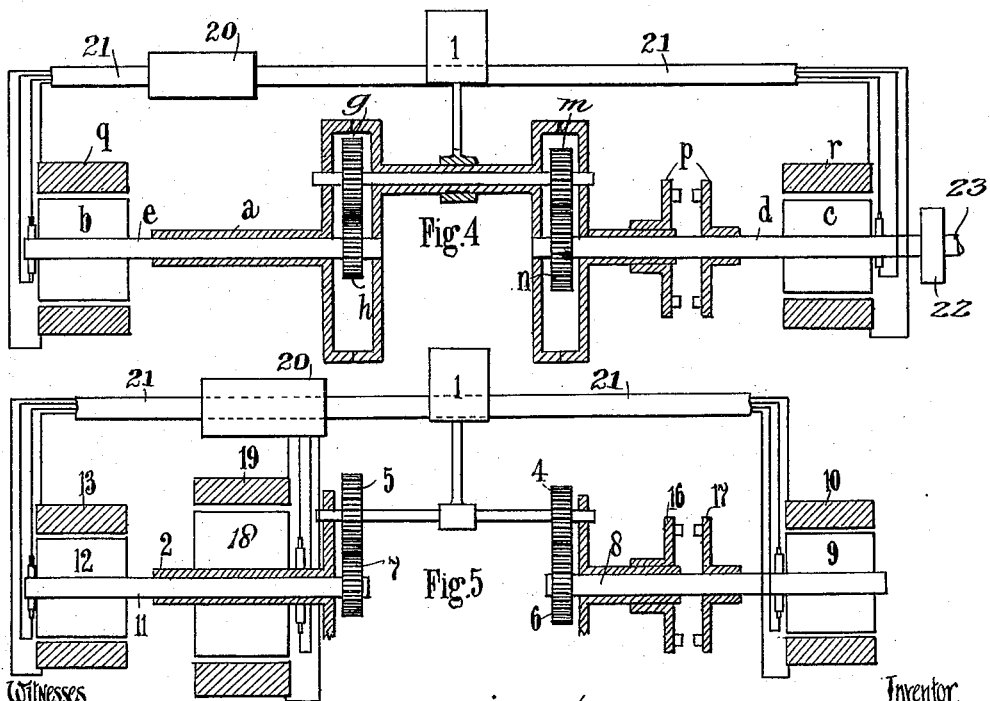

UNITED STATES PATENT OFFICE.

JOHN GODFREY PARRY THOMAS, OF HOLYWELL, WALES.

POWER-TRANSMISSION MECHANISM.

1,144,011.  Specification of Letters Patent.  Patented June 22, 1915.

Application filed October 24, 1910. Serial No. 588,757.

*To all whom it may concern:*

Be it known that I, JOHN GODFREY PARRY THOMAS, a subject of the King of Great Britain, residing at The Vicarage, Holywell, North Wales, have invented new and useful Improvements in Power-Transmission Mechanism, of which the following is a specification.

This invention relates to an arrangement of gearing in connection with crank shafts for the purpose of connecting the crank shaft to other shafts.

The invention may be applied in order to obtain variable speeds of revolution of the driven member but is primarily designed for use in connection with the electromechanical transmission of power on motor vehicles by such systems as that described in my earlier Patent No. 948,436.

In essence the invention consists of an epicyclic gearing in which the sun wheels are co-axial with the crank shaft and the planet wheels with the crank pin. For the purpose of the systems of electromechanical transmission of power referred to, the sun wheels are connected to two separate shafts each of which carries a dynamo electric machine, or in other cases the sun wheel shafts are joined respectively to the road wheels and one dynamo electric machine while the crank shaft carries a second dynamo electric machine; but if the gearing is to be used only as a change speed gearing one of the shafts would be connected with the road wheels and the other with means by which it could be held stationary or clutched to another member of the gearing, or if desired allowed to rotate freely.

In the accompanying drawings the invention is illustrated in three different forms of construction.

Figure 1:
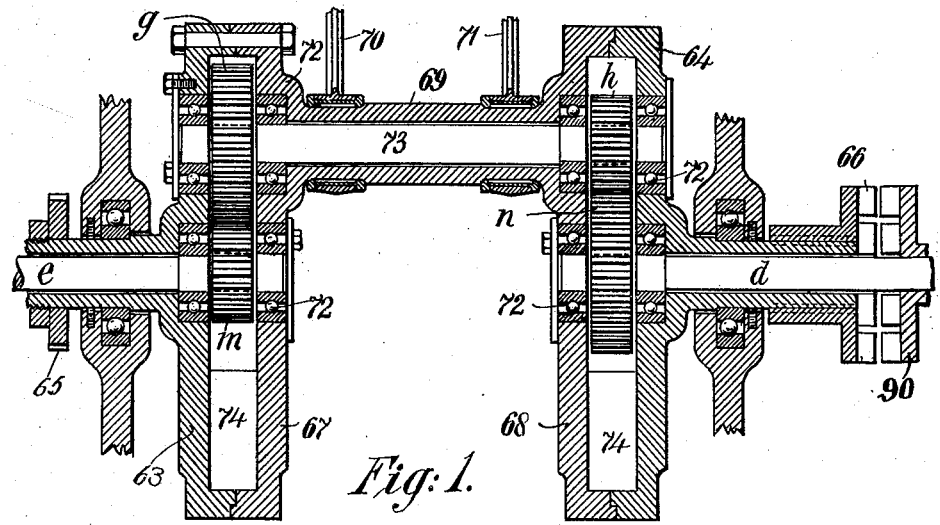
Figure 2:
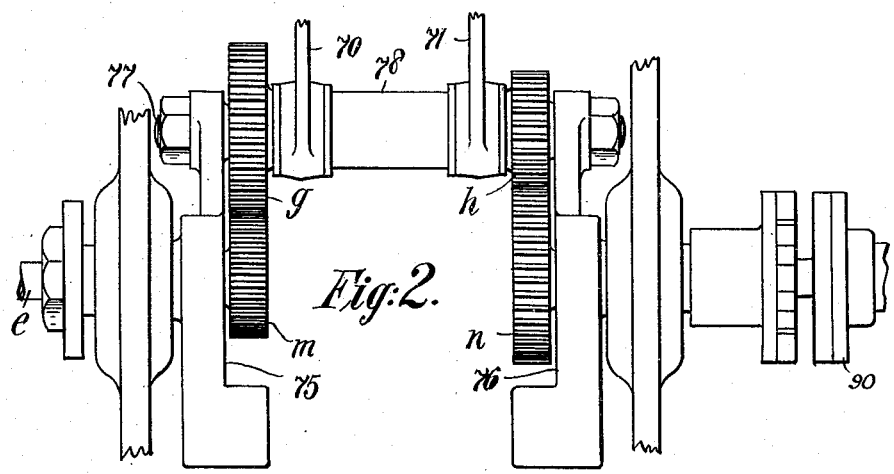

Figure 1 shows a cross section of the preferred form of gearing; Figs. 2 and 3 are external elevations of two modifications. Fig. 4 diagrammatically illustrates the application of the present invention to the system described in my earlier Patent No. 948,436. Fig. 5 diagrammatically illustrates the application of the present invention to the system described in my earlier Patent No. 968,290.

In the construction illustrated in Fig. 1 the engine drives disks 63, 64, formed with elongated bosses surrounding the shafts $e$ and $d$ respectively. The sleeve of disk 63 carries a gear wheel 65 by which the lay shaft for the valves of the engine is driven, while the sleeve of disk 64 carries a clutch part 66 which coöperates with clutch part 90 to lock the members together when desired. The crank is completed by two other disks 67, 68 united by a sleeve 69 forming the crank pin. To this sleeve are accordingly attached connecting rods 70 and 71 for the two cylinders operating alternately. Of course if desired there may be a single cylinder only or two or four cylinders arranged on opposite sides of the crank shaft. Between the disks 63 and 67 are mounted the sun wheel $m$ and the planet wheel $g$, there being only a single planet wheel. These pinions are supported in ball bearings 72. The pinion $g$ is secured to an axle 73 passing through the crank pin 69 and bearing at its other end between the disks 64 and 68 the pinion $h$. This pinion gears with the sun wheel $n$ also mounted in ball bearings 72 between the disks 64 and 68. The sun wheels $m$ and $n$ are secured to their respective shafts $e$ and $d$ which in the electromechanical power transmission systems referred to would carry the armatures of the respective dynamo electric machines. 74 indicates a balance weight secured in the crank disks.

The construction shown in Fig. 2 is slightly different. The shafts $e$ and $d$ in this case each carry one disk only 75 and 76, which are enlarged on one side to form balance weights, and on the other side are united by the crank pin 77. This is surrounded by a sleeve 78 which unites the planet pinions $g$ and $h$ and which is surrounded by the ends of the connecting rods 70 and 71. The sun wheels $m$ and $n$ are overhung as it were within the crank so that these as well as the planet pinions have each but a single ball bearing 72.

The construction shown in Fig. 3 is closely analogous to that of Fig. 1 save that the crank proper is formed as in Fig. 2 by two single disks 75, 76. The planet pinions $g$ and $h$ are placed outside the crank. In this arrangement it is impossible to have a pinion on the crank shaft for driving the lay shaft unless the crank shaft is carried right through beyond the surrounding sleeve. Instead therefore, one of the crank disks is formed as a gearing member, its periphery being provided with spur or other teeth as at 79.

In Fig. 4, 1 indicates a prime motor serving to drive the crank shaft $a$. $q$ is the field and $b$ the armature of a dynamo electric machine, the armature being keyed to shaft $e$. $r$ is the field and $c$ the armature of another dynamo electric machine of which the armature is keyed to shaft $d$. $p$, $p$ are clutch parts corresponding to the clutch parts 90 of Fig. 1 by which the gearing $g$, $h$, $m$, $n$, may be rendered inoperative. Shaft $d$ is also connected to the road wheels for instance through gearing indicated at 22 and the load shaft 23. In this figure the parts are lettered to correspond with my previous Patent No. 948,436, and it will be readily understood that the functions performed by the separate elements are the same as described in that earlier patent. The clutch parts $p$ are not actually on the same parts but that is immaterial to their action. The action of this mechanism as described in the earlier patent referred to is as follows: On starting the prime motor 1 the magnets $q$ are left unexcited; consequently, the resistance to the motion of the vehicle holding the sun wheel $n$ stationary, the rotation of the shaft $a$, communicated through the planet pinions, sets the wheel $m$ and armature $b$ in rotation. The field $q$ is then gradually excited, and the current generated in the armature $b$ is led into the armature $c$, the field $r$ of which is fully excited. Two causes then combine to set the vehicle wheels in motion; the current in the armature $b$ sets up a torque tending to stop the rotation of the gear wheel $h$, and this torque is transmitted through the gear wheels $h$ $g$, $m$, $n$ to the shaft $d$; and also this current flowing into the armature $c$ sets up a torque between the armature $c$ and its strong field $r$, which is directly communicated to the shaft $d$. As the vehicle gains speed a back electromotive force is set up in the armature $c$ which tends to stop the current flowing from the armature $b$; to lessen this action, the field $r$ is gradually diminished. By this means a condition is reached in which the armature $b$ is rotating quite slowly in a strong field, but at a sufficient speed to maintain such a current as will produce by reaction on the field $q$, the torque necessary to balance that transmitted from the engine.

After the field $q$ has been brought to its full strength and the field $r$ diminished to zero, it is possible to proceed further by reversing the field $r$, so that the machine $c$ $r$ operates as a generator and supplies current to the machine $b$ $q$ working as a motor. As a result, this latter machine now rotates in the same direction as the engine shaft $a$, and by the gradual strengthening of the field $r$ this action may be increased until the armature $b$ rotates at the same speed as the shaft $a$. In this condition the whole of the gearing will be rotated solidly and the two shafts $a$, $d$, and $e$ will have the same speed in the same direction. At this stage therefore, the clutch $p$ may be engaged so that the whole transmission becomes mechanical thus giving a purely mechanical drive on the top speed.

In precisely similar fashion the parts lettered in Fig. 5 correspond in function with those similarly lettered in my previous Patent No. 968,290. The prime motor 1 there drives shaft 2 which has upon it the armature 18 of a dynamo electric machine 18, 19. Through the pinions 5, 7, the crank shaft 2 is connected with shaft 11 on which is secured the armature 12 of a dynamo electric machine 12, 13. Pinions 4 and 6 connect the crank shaft to shaft 8 which proceeds to the wheels and also carries the armature 9 of a dynamo electric machine 9, 10. The clutch parts 16, 17 although not arranged on the same members as in the previous application referred to, serve as before the purpose of rendering the gearing 4, 5, 6, 7 inoperative. The action of this mechanism, as described in the second patent referred to, is the same as the action of the apparatus of the first patent up to a certain point, viz. to the point when the machine $c$ $r$ of the older arrangement is to change its function. At this stage in the present case the machine 18, 19 is substituted for the machine 9, 10, the machine 9, 10 being put on open circuit or otherwise rendered inactive. The speed increase is effective in the corresponding manner by increasing the field 19 until the shafts 8 and 11 attain a common speed. If desired of course this speed may be exceeded (the clutch part 16, 17 being left disengaged) by decreasing the field 13. In both cases it will be understood that the necessary control operations above set out are effected by suitable control apparatus, indicated diagrammatically at 20, as fully described in the patents referred to, to which the respective electrical members are joined through connections 21. From these two examples it will be readily understood how the gearing may be applied to similar electromechanical transmission systems.

What I claim is:—

1. In a motor driven vehicle the combination of a prime motor, a crank shaft driven thereby, shafts concentric with said crank shaft, pinions on the crank, pinions on the other shafts respectively intermeshing therewith, dynamo electric machines on two of the three shafts, and means operatively connecting said machines electrically.

2. In a motor driven vehicle the combination of a prime motor, a crank shaft driven thereby, shafts concentric with said crank shaft, pinions on the crank, pinions on the concentric shafts respectively intermeshing therewith, dynamo electric machines on said concentric shafts, and means operatively connecting said machines electrically.

3. In a power transmission system, the combination with a prime motor, of a crank shaft driven thereby, a load shaft, an electrical machine connected with said load shaft co-axial with the crank shaft, a second electrical machine co-axial with the crank shaft, means electrically interconnecting said machines, pinions attached to said machines, and intermeshing pinions upon the crank.

4. In an electromechanical power transmission system, the combination with a prime motor, of a crank shaft with hollow cranks, electrically interconnected dynamo electric machines co-axial with the crank shaft, pinions upon the crank pin within said hollow cranks and intermeshing pinions attached to said machines.

5. In an electromechanical power transmission system, the combination with two electrically interconnected dynamo electric machines, one joined to the load, and a prime motor driving a crank shaft, of a gear interconnecting said prime motor and dynamo electric machines, comprising pinions upon the crank pin, and intermeshing pinions co-axial with the crank shaft.

6. In an electromechanical power transmission system, the combination with a prime motor of a hollow crank shaft with hollow cranks joined by a sleeve, of a crank pin spindle within said sleeve, pinions thereon within the hollow cranks, shafts extending within the hollow crank shaft, pinions on said shafts intermeshing with the pinions on the crank pin, and electrically interconnected dynamo electric machines upon said shafts.

7. In an electromechanical power transmission system, the combination with a prime motor of a crank shaft driven thereby, shafts concentric with said crank shaft bearing pinions, intermeshing pinions upon the crank pin, electrically interconnected dynamo electric machines upon said concentric shafts, a clutch member upon the crank shaft, and a co-acting clutch member upon one of said concentric shafts.

In testimony whereof I have signed my name to this specification in the presence of two subscribing witnesses.

JOHN GODFREY PARRY THOMAS.

Witnesses:
KEMP THOMSON,
A. E. O'DELL.

Copies of this patent may be obtained for five cents each, by addressing the "Commissioner of Patents, Washington, D. C."